(No Model.)
L. L. LAMB.
SHREDDER.
No. 601,712.  Patented Apr. 5, 1898.
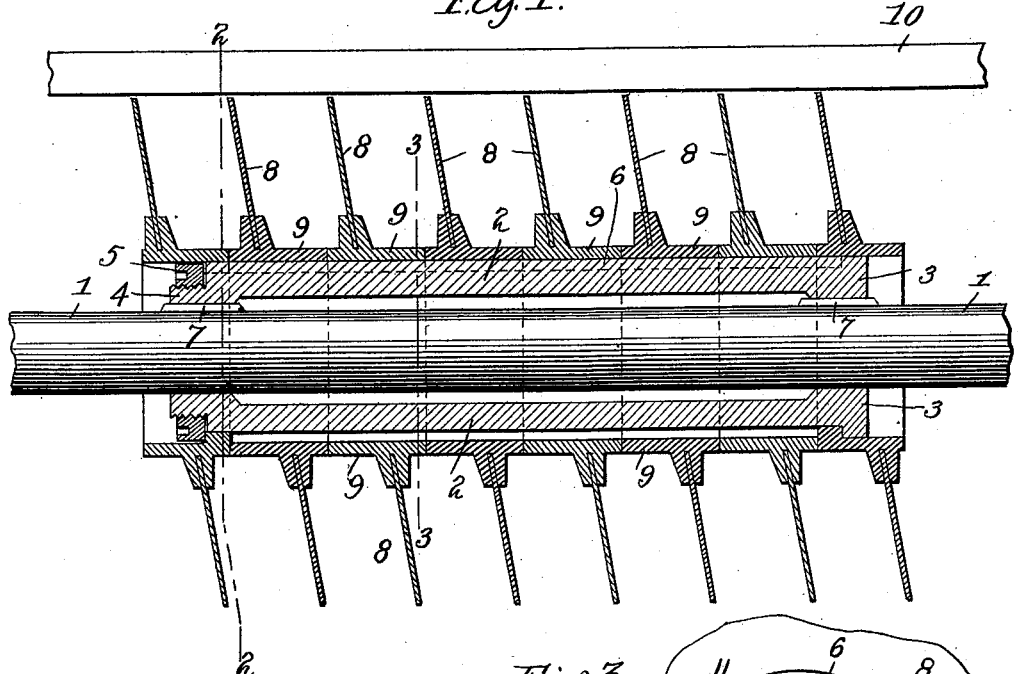
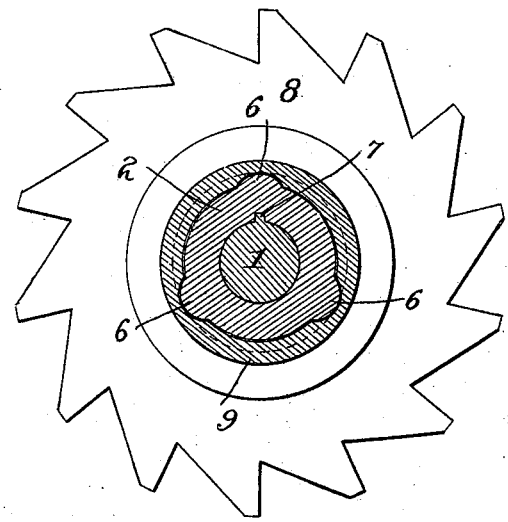
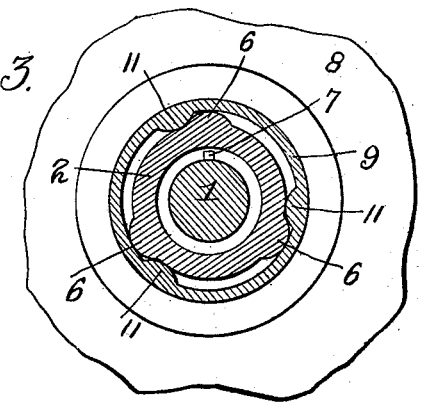
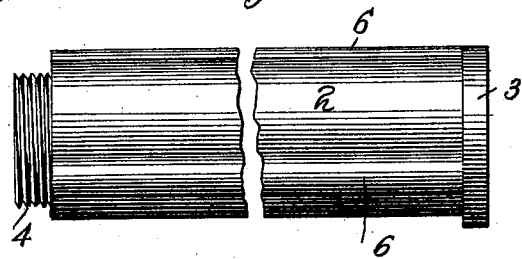
Witnesses.
Wm. W. Rheem
Rob't K. S. Catherwood
Inventor
Levi L. Lamb
by Dwight B. Cheever
Atty

UNITED STATES PATENT OFFICE.

LEVI L. LAMB, OF CHICAGO, ILLINOIS, ASSIGNOR TO THE WHITMAN & BARNES MANUFACTURING COMPANY, OF AKRON, OHIO.

SHREDDER.

SPECIFICATION forming part of Letters Patent No. 601,712, dated April 5, 1898.

Application filed July 17, 1897. Serial No. 644,885. (No model.)

*To all whom it may concern:*

Be it known that I, LEVI L. LAMB, a citizen of the United States, residing at Chicago, in the county of Cook and State of Illinois, have invented new and useful Improvements in Shredders; and I hereby declare that the following is a full, clear, and exact description of my invention in its best form now known to me, reference being had to the accompanying drawings, which form a part of this specification.

The object of my invention is to provide a shredder for use in feed-cutters, clay-cutters, and other machines for shredding materials which shall be efficient in operation, of simple construction, and provide for the ready removal and replacement of working parts when worn, broken, or requiring repair or replacement.

Figure 1 is a sectional elevation through the center of the shredder. Fig. 2 is an end view showing one of the cutter-blades. Fig. 3 is a broken end elevation showing the manner of fastening the cutter-blades together and to the shaft, and Fig. 4 is a side view of the sleeve.

Similar figures represent similar parts throughout the several views.

In the drawings, 1 represents the shaft to which the shredder is attached, which is adapted to fit in bearings in the machine in which the shredder is to be used.

2 is a sleeve, preferably of cast-iron, having at one end the flange 3 and at the other the threads, 4 adapted to fit the nut 5. The sleeve is hollow and, except at the ends, is sufficiently larger than the shaft to leave a space between them. At the two ends it fits closely to the shaft and is rigidly fastened to it by the keys 7, as shown. The sleeve 2 has on its outside the ridges 6, running its entire length. These provide bearing-surfaces on which the collars or hubs 9 of the cutting-tools 8 can rest, and there being only these three lines of contact required the sleeve needs very little machine-work to true it up.

The cutting-blades or serrated disks consist of a series of metal plates 8, preferably of sheet iron or steel, notched as shown, having cast about their center the hubs or collars 9, and are placed in succession substantially parallel to each other upon the sleeve 2. By casting the hub about the center of the plate the two are easily formed in one piece, thereby securing a more stable, uniform, and durable machine and saving the labor and expense of a number of parts and a large amount of machine-work which is necessary to fit up a shredder as heretofore constructed with separable collars secured to the plates. The plates are made at such an oblique angle to the axis of the shaft and the hub and the hubs or collars are made of such length that when upon the shaft opposite edges of successive plates are in substantially the same plane perpendicular to the axis of the shaft. In practice I prefer that the plates be at about the angle shown in the drawings; but a different angle may be used and the proportion of parts changed without essentially changing the result. This construction forms a cylinder of sharp teeth, and when revolving opposite the cutting-bar 10 each point on the bar will be touched by one or more teeth during each revolution.

The hubs or collars are cast with the internal ribs 11, adapted to bear against the ridges 6 of the sleeve 2. In order to save machine-work, the diameter of the inside of the hubs or collars is made, in casting, such that it will just slip over the ridges 6 on the sleeve 2.

In putting the shredder together the hub of the end plate is turned up to fit against flange 3 of sleeve 2. Then the successive plates are put on the sleeve, as shown, and after the last one is on the nut 5 is tightened, thus binding all rigidly together.

Should one of the cutting-plates or serrated disks be broken or become dull, the nut 5 can be removed, the defective plate taken out, and a new one put in its place and the whole put together again.

Having thus described my invention, what I claim, and desire to secure by Letters Patent, is—

1. In a shredder, the combination of the annular cutting-plates, the series of annular hubs cast on said annular cutting-plates having a cylindrical portion fitting upon an inner sleeve and a raised portion which extends around said cylindrical portion at an incline to the axis thereof and the sleeve with which said hub interlocks, substantially as described.

2. In a shredder the combination of the shaft 1, the sleeve 2, rigidly attached to said shaft 1, said sleeve having on its outside the three ridges 6, a series of cutting-plates or saws 8 having hubs 9 adapted to fit over said sleeve, three ridges on the inside of said hub 9 adapted to engage with the three ridges 6 on the outside of said sleeve 2, means for securing said plates and hubs to said sleeve, said plates 8 being substantially parallel with each other and at such an angle to the axis of said shaft 2 that opposite edges of successive plates lie in substantially the same plane perpendicular to the axis of said shaft, substantially as described.

LEVI L. LAMB.

Witnesses:
D. B. CHEEVER,
ROBT. K. S. CATHERWOOD.